United States Patent
Donovan et al.

(10) Patent No.: US 8,756,910 B2
(45) Date of Patent: Jun. 24, 2014

(54) GAS TURBINE ENGINE AND COOLING SYSTEM

(75) Inventors: Eric Sean Donovan, Fishers, IN (US); William Daniel Feltz, Westfield, IN (US); Steven Wesley Tomlinson, Brownsburg, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 389 days.

(21) Appl. No.: 12/978,959

(22) Filed: Dec. 27, 2010

(65) Prior Publication Data

US 2012/0144843 A1 Jun. 14, 2012

Related U.S. Application Data

(60) Provisional application No. 61/291,540, filed on Dec. 31, 2009.

(51) Int. Cl.
  *F02K 99/00* (2009.01)
(52) U.S. Cl.
  USPC ............ 60/266; 60/782; 60/785; 60/806; 60/226.1; 60/267; 415/176; 415/115; 415/178
(58) Field of Classification Search
  USPC ............ 60/266, 226.1, 267, 782, 785, 806; 415/176, 178, 115
  See application file for complete search history.

(56) References Cited

U.S. PATENT DOCUMENTS

| | | | |
|---|---|---|---|
| 4,254,618 A * | 3/1981 | Elovic | ............ 60/226.1 |
| 4,254,918 A | 3/1981 | Elovic | |
| 5,269,133 A | 12/1993 | Wallace | |
| 5,297,386 A | 3/1994 | Kervistin | |
| 5,581,996 A | 12/1996 | Koch et al. | |
| 6,058,696 A | 5/2000 | Nikkanen et al. | |
| 6,134,880 A | 10/2000 | Yoshinaka | |
| 6,182,435 B1 | 2/2001 | Niggemann et al. | |
| 6,748,743 B1 | 6/2004 | Foster-Pegg | |
| 7,377,100 B2 | 5/2008 | Bruno et al. | |
| 7,926,261 B2 | 4/2011 | Porte | |
| 2007/0051091 A1 | 3/2007 | Rolt | |
| 2007/0130912 A1 | 6/2007 | Kraft et al. | |
| 2007/0245711 A1 * | 10/2007 | Stretton | ............ 60/226.1 |
| 2008/0053059 A1 | 3/2008 | Olver et al. | |
| 2008/0112798 A1 | 5/2008 | Seitzer | |
| 2008/0230651 A1 * | 9/2008 | Porte | ............ 244/118.5 |
| 2009/0169359 A1 * | 7/2009 | Murphy et al. | ............ 415/115 |

FOREIGN PATENT DOCUMENTS

| FR | 2 400 618 | 3/1979 |
|---|---|---|
| FR | 2 891 313 | 3/2007 |
| GB | 2 437 295 | 10/2007 |

OTHER PUBLICATIONS

International Search Report and Written Opinion, PCT/US10/62359, Rolls-Royce North American Technologies Inc., Nov. 21, 2011.
Supplementary European Search Report, EP 10 85 1162, Jul. 30, 2013, Rolls-Royce North American Technologies, Inc.

* cited by examiner

*Primary Examiner* — Craig Kim
(74) *Attorney, Agent, or Firm* — Krieg DeVault LLP

(57) ABSTRACT

One embodiment of the present invention is a unique gas turbine engine. Another embodiment is a unique cooling system for a gas turbine engine. Other embodiments include apparatuses, systems, devices, hardware, methods, and combinations for cooling one or more objects of cooling. Further embodiments, forms, features, aspects, benefits, and advantages of the present application shall become apparent from the description and figures provided herewith.

22 Claims, 2 Drawing Sheets

GAS TURBINE ENGINE AND COOLING SYSTEM

CROSS REFERENCE TO RELATED APPLICATIONS

The present application claims the benefit of U.S. Provisional Patent Application 61/291,540, filed Dec. 31, 2009, and is incorporated herein by reference.

GOVERNMENT RIGHTS

The present application was made with United States government support under Contract No. FA8650-07-C-2803 awarded by the United States Air Force. The United States government may have certain rights in the present application.

FIELD OF THE INVENTION

The present invention relates to gas turbine engines, and more particularly, to a cooling system for use in a gas turbine engine.

BACKGROUND

Cooling systems that effectively cool objects of cooling, such as fluids or devices in a gas turbine engine, remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique cooling system for a gas turbine engine. Other embodiments include apparatuses, systems, devices, hardware, methods, and combinations for cooling one or more objects of cooling. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
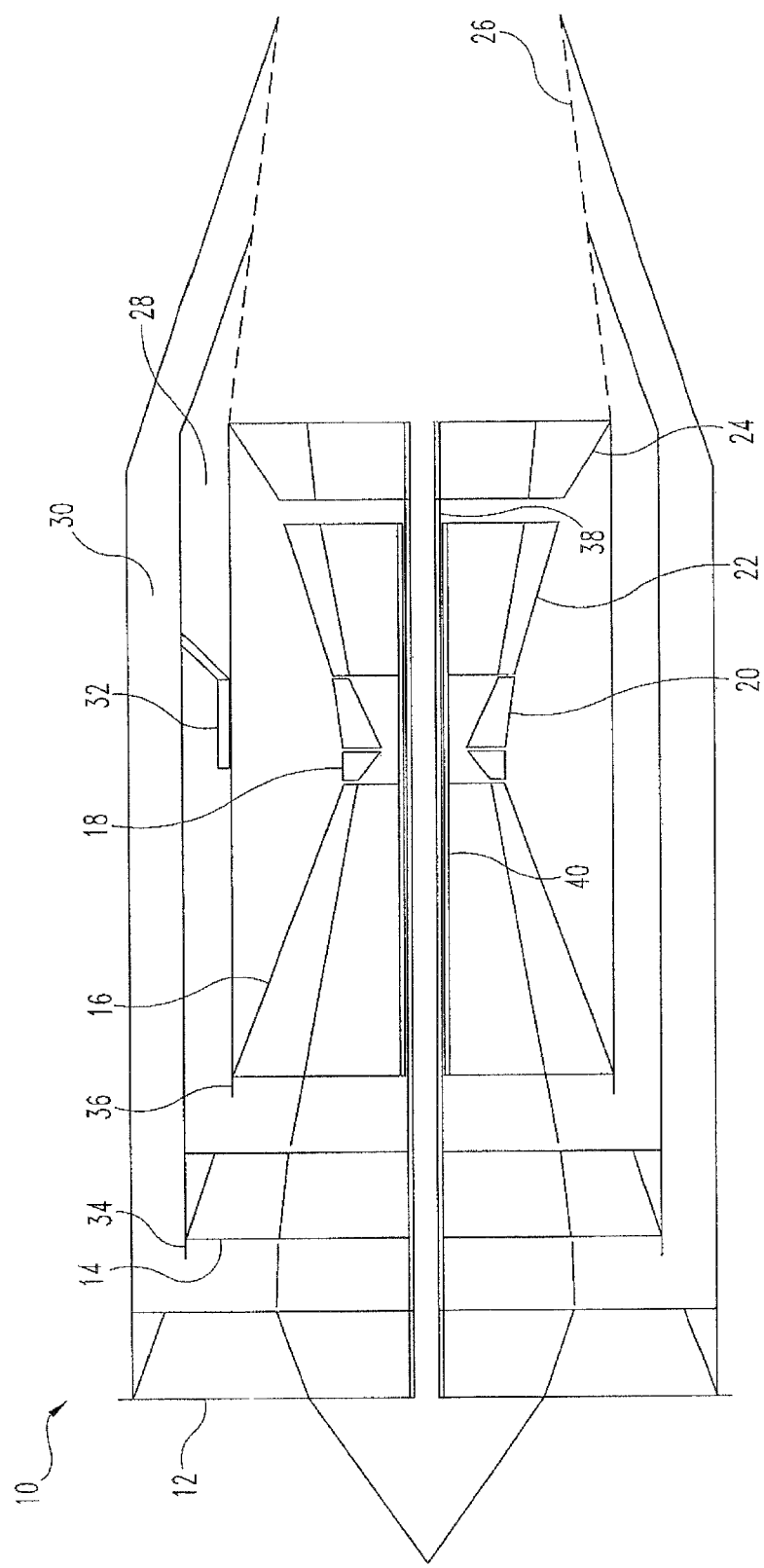
FIG. 1 schematically depicts a non-limiting example of a gas turbine engine with a cooling system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, a non-limiting example of a gas turbine engine 10 in accordance with an embodiment of the present invention is schematically depicted. In one form, gas turbine engine 10 is an aircraft propulsion power plant in the form of a turbofan engine. In various embodiments, engine 10 may be any gas turbine engine configuration. Gas turbine engine 10 includes a fan 12, a fan 14, a compressor system 16, a diffuser 18, a combustor 20, a turbine system with a high pressure (HP) turbine 22 and a low pressure (LP) turbine 24, an exhaust nozzle system 26, a bypass duct 28, a bypass duct 30, and a cooling system 32.

Each of fan 12 and fan 14 include a plurality of fan blades that pressurize air received at the fan inlet. In one form, fan 12 includes a single stage of circumferentially spaced blades and a single stage of circumferentially spaced vanes. In other embodiments, fan 12 may not include vanes, or may include multiple stages of both blades and vanes. Likewise, in one form, fan 14 includes a single stage of circumferentially spaced blades and a single stage of circumferentially spaced vanes. In other embodiments, fan 14 may not include vanes, or may include multiple stages of both blades and vanes. In one form, gas turbine engine 10 includes a flow control system 34 to direct some of the pressurized air discharged from fan 12 into fan 14 and some of the pressurized air into bypass duct 30. In some embodiments, flow control system 34 is configured to vary the amount of flow as between fan 14 and bypass duct 30. In some embodiments, flow control system 34 may be an active means of directing flow, e.g., controlled by a control system (not shown). In other embodiments, flow control system 34 may be passive, e.g., controlled based on pressures and/or temperatures in one or more regions of engine 10, or may be fixed. In still other embodiments, gas turbine engine 10 may not include a flow control system such as flow control system 34.

Compressor system 16 includes a plurality of blades and vanes for compressing air. In one form, compressor system 16 is a single compressor having a plurality of stages of blades and vanes driven by a common shaft at a common speed. In other embodiments, compressor system 16 may include a plurality of compressors operating at the same or different speeds, each of which includes one or more stages of blades, and each of which may also include a desirable number of vane stages. For example, in some forms, compressor system 16 may include an LP compressor and/or an intermediate pressure compressor and/or an HP compressor. In one form, gas turbine engine 10 includes a flow control system 36 to direct some of the pressurized air discharged from fan 14 into compressor system 16 and some of the pressurized air into bypass duct 28. In some embodiments, flow control system 36 is configured to vary the amount of flow as between compressor system 16 and bypass duct 28. In some embodiments, flow control system 36 may be an active means of directing flow, e.g., controlled by a control system (not shown). In other embodiments, flow control system 36 may be passive, e.g., controlled by pressures and/or temperatures in one or more regions of engine 10, or may be fixed. In still other embodiments, gas turbine engine 10 may not include a flow control system such as flow control system 36.

Diffuser 18 and combustor 20 are fluidly disposed between compressor system 16 and HP turbine 22. Compressor system 16, diffuser 18, combustor 20, HP turbine 22 and LP turbine 24 form an engine core. HP turbine 22 and LP turbine 24 extract power from the airflow exiting combustor 20. LP turbine 24 is drivingly coupled to fan 12 via an LP shaft 38. HP turbine 22 is drivingly coupled to compressor system 16 via an HP shaft 40. Compressor system 16, HP shaft 40 and HP turbine 22 form, in part, an HP spool. Fan 12, LP shaft 38 and LP turbine 24 form, in part, an LP spool. In one form, fan 14 is driven by LP turbine 24, which may be a direct coupling via LP shaft 38 in some embodiments. In other embodiments, fan 14 may be coupled to LP turbine 24 via a system that allows fan 14 to operate at a different speed than LP turbine 24, e.g., a fixed speed ratio or a variable ratio gear train. In still other embodiments, fan 14 may be powered by HP turbine 22.

During the operation of gas turbine engine 10, air is drawn into the inlet of fan 12 and pressurized by fan 12. Some of the air pressurized by fan 12 is directed into fan 14 by flow control system 34, and the balance is directed into bypass duct 30. Bypass duct 30 channels the pressurized air to exhaust nozzle system 26, which provides a component of the thrust output by gas turbine engine 10. The air directed into fan 14 is further pressurized by fan 14. Some of the air pressurized by fan 14 is directed into compressor system 16 by flow control system 36, and the balance is directed into bypass duct 28. Bypass duct 28 channels the pressurized air to exhaust nozzle system 26, which provides a component of the thrust output by gas turbine engine 10. Exhaust nozzle system 26 is operative to control the pressure of the air streams in exhaust nozzle system 26, including balancing pressures as between bypass duct 28 and bypass duct 30.

Compressor system 16 receives the pressurized air from fan 14, which is compressed and discharged in to diffuser 18. Diffuser 18 diffuses the core flow that is discharged from compressor system 16, reducing its velocity and increasing its static pressure. The diffused airflow is directed into combustor 20. Fuel is mixed with the air in combustor 20, which is then combusted in a combustion liner (not shown). The hot gases exiting combustor 20 are directed into HP turbine 22, which extracts energy from the hot gases in the form of mechanical shaft power to drive compressor system 16 via HP shaft 40. The hot gases exiting HP turbine 22 are directed into LP turbine 24, which extracts energy in the form of mechanical shaft power to drive fan 12 and fan 14 via LP shaft 38. The hot gases exiting LP turbine 24 are directed into nozzle 26, and provide a component of the thrust output by gas turbine engine 10.

The airflow that passes through compressor system 16 and subsequently into combustor 20 is referred to herein as core flow. The pressurized airflow exiting fan 14 and received into bypass duct 28 is referred to herein as a second stream flow; and the pressurized airflow exiting fan 14 and received into bypass duct 30 is referred to herein as a third stream flow. Each of the core flow, second stream flow and third stream flow are working fluid streams. Working fluid in the context of the present application is the air that is compressed (pressurized) and/or expanded in one or more of the engine's fan, compressor and turbine stages to produce the thrust output by the engine.

Cooling system 32 is in fluid communication with compressor system 16. Cooling system 32 is operative to receive core airflow from compressor system 16, and extract heat therefrom to reduce the temperature of the received core airflow. In one form, the airflow that is received by cooling system 32 is a small portion of the core airflow, and is returned to the engine 10 core for use in cooling turbine blades and vanes of HP turbine 22. In another form, the core air that is received by cooling system 32 represents a larger amount of air, e.g., substantially all of the core airflow in some embodiments, and is returned to compressor system 16 for additional compression. For example, in such embodiments, cooling system 32 may serve as an intercooler system. In still other embodiments, cooling system 32 may be employed to reduce the temperature of other objects of cooling. An object of cooling, as used herein, is the fluid, whether in liquid or gas form, and/or component and/or system that is sought to be cooled. For example, in other forms, objects of cooling may be one or more of hydraulic fluid and/or related systems, electrical and/or electronic circuits and/or systems, mechanical components and/or systems, and/or other components and/or systems, such as refrigeration components and/or systems.

Figure 2:
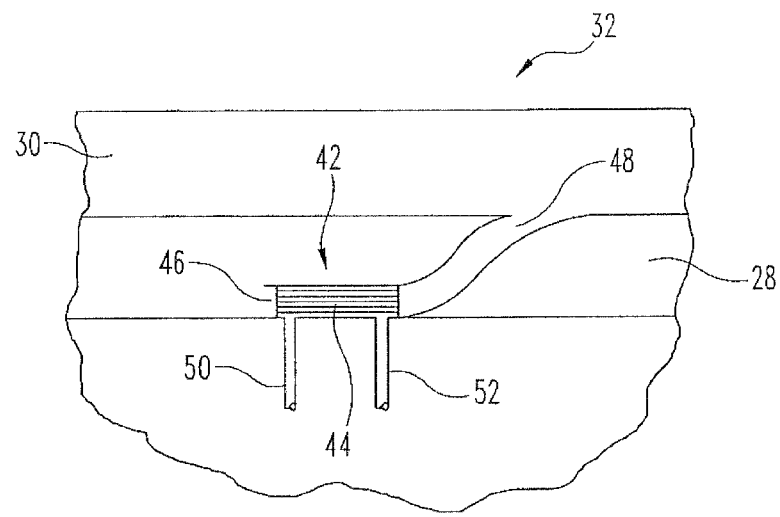
FIG. 2 depicts a non-limiting example of a cooling system in accordance with an embodiment of the present invention.

Referring now to FIG. 2, cooling system 32 is schematically depicted. Cooling system 32 includes a heat exchanger 42 having a heat exchanger core 44, a cooling medium inlet 46 for heat exchanger 42, and a cooling medium outlet 48 for heat exchanger 42. In one form, heat exchanger 42 is located in bypass duct 28, although other locations are contemplated herein.

Heat exchanger 42 structured to remove heat from an object of cooling. In one form, heat exchanger 42 is operative to cool core airflow, in which case cooling system 32 includes a plurality of passages 50, 52. Passages 50, 52 are structured to conduct core airflow to and from heat exchanger 42. For example, where cooling system 32 is an intercooler system, core airflow from compressor system 16 may be directed to heat exchanger 42 via passage 50, and then returned to compressor system 16 via passage 52. In one form, passages 50, 52 include pipes that deliver core airflow to and from heat exchanger 42. In other embodiments, other types of passages may be employed in addition to and/or in place of pipes. In other forms, cooling system 32 may not include passages 50, 52, e.g., where the object of cooling is an electronic component. In one form, heat exchanger 42 is a parallel flow heat exchanger. In other embodiments, other heat exchanger types may be employed, e.g., counter flow heat exchangers, cross flow heat exchangers and/or mixed flow heat exchangers.

Cooling medium inlet 46 is in fluid communication with heat exchanger core 44 and bypass duct 28. In one form, the air pressure in bypass duct 28 is greater than the air pressure in bypass duct 30. Cooling medium inlet 46 is structured to receive a cooling medium in the form of air from a working fluid stream of gas turbine engine 10, namely, from the second stream flow in bypass duct 28. In one form, cooling medium inlet 46 receives a portion of the second stream flow from bypass duct 28. In other embodiments, cooling medium inlet 46 may receive all or substantially all of the second stream flow. Cooling medium outlet 48 is in fluid communication with heat exchanger core 44 and bypass duct 30. Cooling medium outlet 48 is structured to discharge the cooling medium to a third working fluid stream of gas turbine engine 10, namely from the third stream flow in bypass duct 30. Heat exchanger 42 removes heat from the object of cooling, e.g., core airflow, using the cooling medium (pressurized air) received from fan bypass duct 28 through cooling medium inlet 46. The pressurized air is discharged into fan bypass duct 30 through cooling medium outlet 48.

In one form, the pressure differential between the second stream flow and the third stream flow governs the flow rate of the cooling medium through heat exchanger 42. In the depicted embodiments, the pressure differential is determined by the operation of exhaust nozzle system 26, although other systems may determine the pressure differential in other embodiments.

Figure 3:
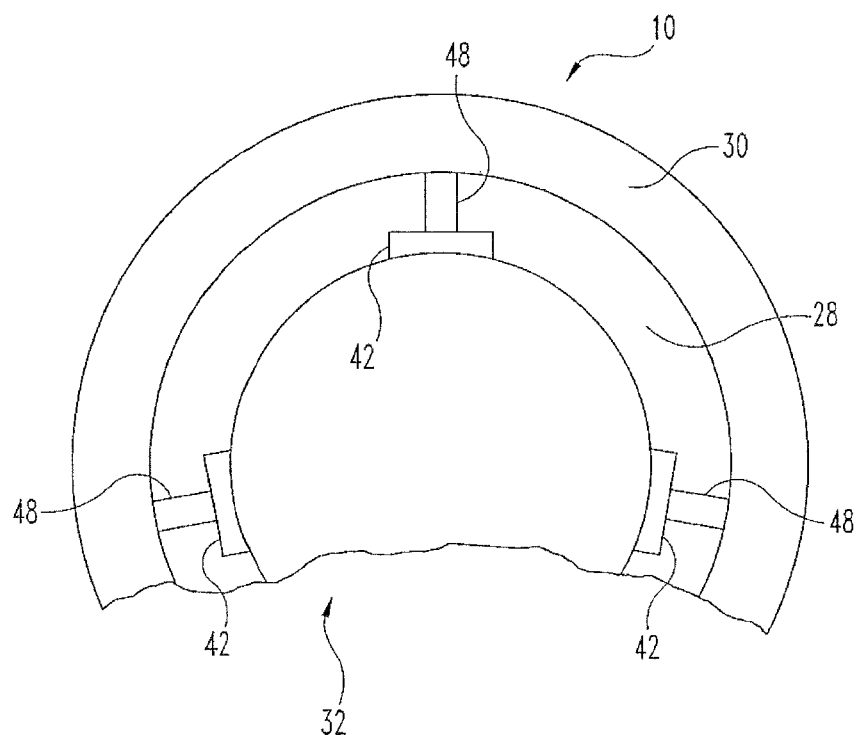
FIG. 3 schematically depicts an end view of the cooling system of FIG. 2.

It will be understood that more than one such cooling system 32 may be employed. For example, referring now to FIG. 3, in one form cooling system 32 may include heat exchangers, inlets and outlets that are distributed circumferentially and/or axially around gas turbine engine 10, e.g., in bypass duct 28, bypass duct 30 and/or other locations. It is also contemplated that in some forms, heat exchanger 42 may extend circumferentially around engine 10, e.g., around bypass duct 28, bypass duct 30, and/or inboard of bypass duct 28 and/or outboard of bypass duct 30. In other embodiments, only a single cooling system 32 having a single heat exchanger may be employed.

In other embodiments, the air pressure in bypass duct 30 may be greater than the air pressure in bypass duct 28, in which case cooling medium inlet 46 is positioned to receive the cooling medium from bypass duct 30, and cooling medium outlet 48 is positioned to discharge the cooling medium into bypass duct 28. It is also contemplated that in some embodiments, the direction of pressure differential between bypass duct 28 and bypass duct 30 may alternate. In some such embodiments, cooling system 32 may employ valves or other flow directing systems to maintain flow through heat exchanger core 44 in a given direction. In other such embodiments, heat exchanger 42 may be configured to operate under flow reversing conditions.

Embodiments of the present invention include a cooling system for use with a gas turbine engine. The cooling system includes a heat exchanger operative to cool air of a first working fluid stream of the gas turbine engine; a cooling medium inlet for said heat exchanger structured to receive a cooling medium from a second working fluid stream of the gas turbine engine; and a cooling medium outlet for said heat exchanger structured to discharge the cooling medium to a third working fluid stream of the gas turbine engine. The cooling system is structured to transfer heat from the air of the first working fluid stream to the cooling medium and discharges the cooling medium into the third working fluid stream.

In a refinement, a pressure differential between the second working fluid stream and the third working fluid stream determines the flow rate of the air received from the second working fluid stream through the heat exchanger.

In another refinement, the cooling system includes a passage structured to conduct air of the first working fluid stream to the heat exchanger. In one form, the passage includes a pipe.

In yet another refinement, the heat exchanger is structured to cool only a portion of the air of the first working fluid stream.

In still another refinement, the first working fluid stream is a core air flow of the gas turbine engine. In a further refinement, the third working fluid stream is the output a fan of the gas turbine engine, and the second working fluid stream is the output of another fan of the gas turbine engine.

Embodiments of the present invention also include a cooling system for use with a gas turbine engine. The cooling system includes a heat exchanger structured to remove heat from an object of cooling; a heat exchanger inlet in fluid communication with a first fan bypass duct of the gas turbine engine; and a heat exchanger outlet in fluid communication with a second fan bypass duct of the gas turbine engine. The heat exchanger removes heat from the object of cooling using pressurized air received from the first fan bypass duct through the heat exchanger inlet and discharged into the second fan bypass duct through the heat exchanger outlet.

In a refinement, air pressure in the first fan bypass duct is greater than air pressure in the second bypass duct, and a pressure differential between first fan bypass duct and the second fan bypass duct determines a cooling air flow rate through the heat exchanger. In one further refinement, the pressure differential between the first fan bypass duct and the second fan bypass duct varies with a thrust output of the gas turbine engine.

In another refinement, the first fan bypass duct channels a first thrust component of the gas turbine engine thrust output, the second fan bypass duct channels a second thrust component of the gas turbine engine thrust output, and a pressure differential between first fan bypass duct and the second fan bypass duct determines a cooling air flow rate through the heat exchanger.

In a further refinement, the heat exchanger is in fluid communication with an engine core of the gas turbine engine, and the object of cooling is air received from the engine core.

Embodiments of the present invention further include a gas turbine engine. The gas turbine engine includes a first fan; a second fan in fluid communication first fan; a compressor system in fluid communication with at least one of the first fan and the second fan; a combustor in fluid communication with the compressor system and structured to receive a first working fluid stream discharged by the compressor system; a turbine system in fluid communication with the combustor to received and extract power from the first working fluid stream, the turbine system being drivingly coupled to the first fan, the second fan and the compressor system; a first bypass duct in fluid communication with the second fan and structured to conduct a second working fluid stream; a second bypass duct in fluid communication with the first fan and structured to conduct a third working fluid stream; and a heat exchanger in fluid communication with the second working fluid stream and the third working fluid stream and operable to remove heat from an object of cooling.

In a refinement, the heat exchanger is in fluid communication with the compressor system, and the object of cooling is air of the first working fluid stream. In a further refinement, the heat exchanger is structured to cool only a portion of the air of the first working fluid stream. In an additional refinement, the gas turbine engine includes a passage is structured to conduct the air of the first working fluid stream to the heat exchanger. In one form, the passage includes a pipe.

In another refinement, the first working fluid stream, the second working fluid stream and the third working fluid stream are discharged as thrust output components of the gas turbine engine.

In still another refinement, the gas turbine engine includes an exhaust nozzle in fluid communication with at least one of the first bypass duct and the second bypass duct, the exhaust nozzle being operable to control a pressure in at least one of the first bypass duct and the second bypass duct.

In yet another refinement, the third working fluid stream has a lower pressure than the second working fluid stream, and the heat exchanger cools the object of cooling using flow generated by the pressure differential between the second working fluid stream and the third working fluid stream.

In yet still another refinement, the heat exchanger is located in at least one of the first bypass duct and the second bypass duct.

In a further refinement, the gas turbine engine includes an exhaust nozzle structured to control a pressure differential between the first bypass duct and the second bypass duct.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A cooling system for use with a gas turbine engine, comprising:
   a heat exchanger operative to cool air of a first working fluid stream of the gas turbine engine;
   a cooling medium inlet for said heat exchanger structured to receive a cooling medium from a second working fluid stream in one of a first fan bypass duct and a second fan bypass duct in fluid communication with a fan of the gas turbine engine; and
   a cooling medium outlet for said heat exchanger structured to discharge the cooling medium to a third working fluid stream in the other of a first fan bypass duct and a second fan bypass duct in fluid communication with another fan of the gas turbine engine,
   wherein said cooling system is structured to transfer heat from the air of the first working fluid stream to the cooling medium and discharge the cooling medium into the third working fluid stream.

2. The cooling system of claim 1, wherein a pressure differential between the second working fluid stream and the third working fluid stream determines a flow rate of the air received from the second working fluid stream through said heat exchanger.

3. The cooling system of claim 1, further comprising a passage structured to conduct air of the first working fluid stream to the heat exchanger.

4. The cooling system of claim 3, wherein said passage includes a pipe.

5. The cooling system of claim 1, wherein said heat exchanger is structured to cool only a portion of the air of the first working fluid stream.

6. The cooling system of claim 1, wherein the first working fluid stream is a core air flow of said gas turbine engine.

7. The cooling system of claim 6, wherein the second working fluid stream is the output of the fan of said gas turbine engine, and wherein the third working fluid stream is the output of the other fan of said gas turbine engine.

8. A cooling system for use with a gas turbine engine, comprising:
   a heat exchanger structured to remove heat from an object of cooling;
   a heat exchanger inlet in fluid communication with a first fan bypass duct in fluid communication with a fan of the gas turbine engine; and
   a heat exchanger outlet in fluid communication with a second fan bypass duct in fluid communication with another fan of the gas turbine engine,
   wherein said heat exchanger removes heat from the object of cooling using pressurized air received from said first fan bypass duct through said heat exchanger inlet and discharged into said second fan bypass duct through said heat exchanger outlet.

9. The cooling system of claim 8, wherein air pressure in the first fan bypass duct is greater than air pressure in the second fan bypass duct, and wherein a pressure differential between the first fan bypass duct and the second fan bypass duct determines a cooling air flow rate through said heat exchanger.

10. The cooling system of claim 9, wherein the pressure differential between the first fan bypass duct and the second fan bypass duct varies with a thrust output of the gas turbine engine.

11. The cooling system of claim 8, wherein the first fan bypass duct channels a first thrust component of the gas turbine engine thrust output, wherein the second fan bypass duct channels a second thrust component of the gas turbine engine thrust output, and wherein a pressure differential between the first fan bypass duct and the second fan bypass duct determines a cooling air flow rate through said heat exchanger.

12. The cooling system of claim 8, wherein said heat exchanger is in fluid communication with an engine core of the gas turbine engine, and wherein the object of cooling is air received from the engine core.

13. A gas turbine engine, comprising:
   a first fan;
   a second fan in fluid communication said first fan;
   a compressor system in fluid communication with at least one of said first fan and said second fan;
   a combustor in fluid communication with said compressor system and structured to receive a first working fluid stream discharged by said compressor system;
   a turbine system in fluid communication with said combustor to receive and extract power from the first working fluid stream, said turbine system being drivingly coupled to said first fan, said second fan and said compressor system;
   a first bypass duct in fluid communication with said second fan and structured to conduct a second working fluid stream;
   a second bypass duct in fluid communication with said first fan and structured to conduct a third working fluid stream; and
   a heat exchanger in fluid communication with the second working fluid stream and the third working fluid stream and operable to remove heat from an object of cooling using air extracted from the second working fluid stream and discharged into the third working fluid stream.

14. The gas turbine engine of claim 13, wherein said heat exchanger is in fluid communication with said compressor system, and wherein the object of cooling is air of the first working fluid stream.

15. The gas turbine engine of claim 14, wherein said heat exchanger is structured to cool only a portion of the air of the first working fluid stream.

16. The gas turbine engine of claim 14, further comprising a passage structured to conduct the air of the first working fluid stream to the heat exchanger.

17. The gas turbine engine of claim 16, wherein said passage includes a pipe.

18. The gas turbine engine of claim 13, wherein the first working fluid stream, the second working fluid stream and the third working fluid stream are discharged as thrust output of said gas turbine engine.

19. The gas turbine engine of claim 13, further comprising an exhaust nozzle in fluid communication with at least one of said first bypass duct and said second bypass duct, said exhaust nozzle being operable to control a pressure in said at least one of said first bypass duct and said second bypass duct.

20. The gas turbine engine of claim 13, wherein the third working fluid stream has a lower pressure than the second working fluid stream, and wherein said heat exchanger cools the object of cooling using flow generated by a pressure differential between the second working fluid stream and the third working fluid stream.

21. The gas turbine engine of claim 13, wherein said heat exchanger is located in at least one of said first bypass duct and said second bypass duct.

22. The gas turbine engine of claim 13, further comprising an exhaust nozzle operable to control a pressure differential between said first bypass duct and said second bypass duct.

* * * * *